G. M. POWERS.
TRUSS PAD.
APPLICATION FILED JULY 23, 1918.

1,284,769.

Patented Nov. 12, 1918.

G. M. Powers, Inventor

Witness

By C. A. Snow & Co.
Attorneys

UNITED STATES PATENT OFFICE.

GEORGE M. POWERS, OF CINCINNATI, OHIO.

TRUSS-PAD.

1,284,769.

Specification of Letters Patent.  Patented Nov. 12, 1918.

Application filed July 23, 1918.  Serial No. 246,336.

*To all whom it may concern:*

Be it known that I, GEORGE M. POWERS, a citizen of the United States, residing at Cincinnati, in the county of Hamilton and State of Ohio, have invented a new and useful Truss-Pad, of which the following is a specification.

The device forming the subject matter of this application is a truss, and the invention aims to provide novel means for assembling the pad with the supporting portion of the truss in such a way that the pad will have an upward lifting action on the rupture, novel means being provided for holding the pad in adjusted positions.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
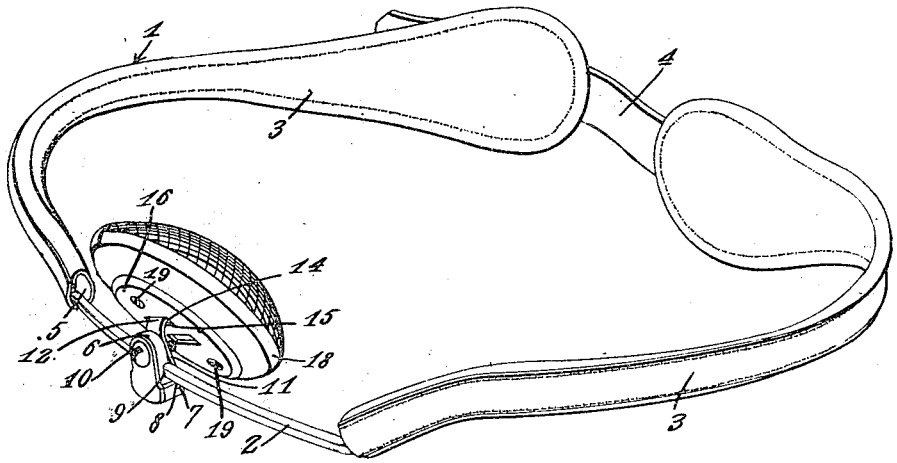
Figure 2:
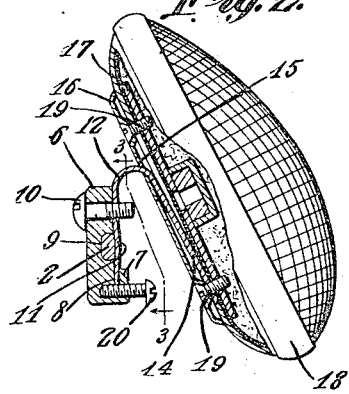
Figure 3:
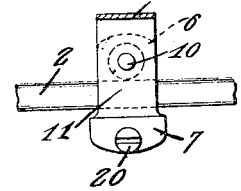

Figure 1 shows in perspective, a device constructed in accordance with the present invention; Fig. 2 is a transverse section wherein parts appear in elevation; and Fig. 3 is a section taken on the line 3—3 of Fig. 2.

In carrying out the invention there is provided a support denoted by the numeral 1. The support 1 may be of various forms, but in the present instance it is depicted as comprising a body-encircling spring, inclosed partially within covers 3, means 4 being provided for connecting the rear ends of the spring 2 detachably. If desired, fillers 5 may be interposed between the spring 2 and the inner surfaces of the covers 3. The forward ends of the covers are spaced apart, so that the spring 2 is exposed at the front of the truss.

In carrying out the invention there is provided a rider 6, in the form of a block, equipped at its lower end with a rearwardly extended lug 7 having a slot 8 in its upper edge. In the rear side of the rider 6, there is a recess 9 wherein the exposed portion of the spring 2 is received. A securing element, such as a screw 10, is mounted in the upper end of the rider 6 and is threaded into one arm 11 of a U-shaped spring 12, the lower end of the arm 11 being received in the slot 8 in the lug 7 of the rider 6. The spring 12 comprises an arm 14 passing through an opening 15 in a back plate 16 coöperating with a front plate 17 in engaging a pad covering 18. The plates 16 and 17 are caused to clamp the edges of the pad covering 18 by means of securing devices 19, such as screws, one of these screws 19 being engaged with the lower end of the arm 14 of the spring 12, the said arm of the spring lying between the plates 16 and 17, as clearly shown in Fig. 2 of the drawings.

It is to be observed that the front portion of the spring 2, which is exposed, between the covers 3, project rearwardly, to a slight extent, beyond the rear face of the rider 6. As a consequence, the arm 11 of the spring 12 is flexed across the exposed portion of the spring 2. When the lower end of the arm 11 is engaged in the slot 8 of the lug 7, and when the securing element 10 which is threaded into the arm 11 is tightened up, the arm 11 will bind on the member 2 and hold the rider 6 and the pad in place, against shifting movement, longitudinally of the part 2. However, by loosening up the screw 10, the hold of the arm 11 on the member 2 may be released, and then the rider 6 and the pad may be adjusted longitudinally of the part 2. Further, by loosening the screw 10, the spring 12 may be swung with the screw 10 as a fulcrum, the lower end of the arm 11 remaining engaged in the slot 8 of the lug 7. In this way, the angle defined by the pad with respect to the vertical may be adjusted. A screw 20 is threaded into the lower end of the rider 6 and projects rearwardly. This screw forms an abutment, coacting with the back plate 16 of the pad, and limiting the movement of the pad, when the spring 12 yields to an unusual extent. The construction of the device is such, as seen clearly in Fig. 2, that the pad will exert an upward retaining pressure on the rupture, and the pad will be adjusted, in a manner hereinbefore set forth.

Having thus described the invention, what is claimed is:—

1. In a device of the class described, a support; a rider having a slot, and a seat wherein the support is received; a clamping means on the rider; a spring comprising arms, one of which is mounted on the clamping means and is received terminally in the slot; a pad mounted on the other arm of the spring; the pad comprising spaced plates, said other arm of the spring passing between the plates; a covering engaged between the plate; and a clamping device connecting the plates and said other arm of the spring.

2. In a device of the class described, a support; a rider having a seat wherein the support is received, and provided adjacent its lower end with a lug having a slot in its upper edge; a clamping means on the rider; a spring comprising arms, one of which is mounted on the clamping means and is received terminally in the slot; and a pad mounted on the other arm of the spring.

In testimony that I claim the foregoing as my own, I have hereto affixed my signature in the presence of two witnesses.

GEORGE M. POWERS.

Witnesses:
N. L. HELBRUN,
E. H. MATTHEWS.

Copies of this patent may be obtained for five cents each, by addressing the "Commissioner of Patents, Washington, D. C."